REVERTING CALL CIRCUIT, ALL RELAY TYPE

Filed Dec. 26, 1947 3 Sheets-Sheet 1

INVENTOR.
ROY W. JONES
BY
ATTORNEY

Feb. 13, 1951 R. W. JONES 2,541,362

REVERTING CALL CIRCUIT, ALL RELAY TYPE

Filed Dec. 26, 1947 3 Sheets-Sheet 2

INVENTOR.
ROY W. JONES

BY [signature]

ATTORNEY

Feb. 13, 1951 R. W. JONES 2,541,362

REVERTING CALL CIRCUIT, ALL RELAY TYPE

Filed Dec. 26, 1947 3 Sheets-Sheet 3

INVENTOR.
ROY W. JONES

BY

ATTORNEY

Patented Feb. 13, 1951

2,541,362

UNITED STATES PATENT OFFICE 2,541,362

REVERTING CALL CIRCUIT, ALL RELAY TYPE

Roy W. Jones, Rochester, N. Y., assignor to Automatic Electric Laboratories, Inc., Chicago, Ill., a corporation of Delaware Application December 26, 1947, Serial No. 793,995

3 Claims. (Cl. 179—17)

The present invention relates to automatic telephone systems in general and in particular to an improved reverting call circuit of the all relay type for use with party line systems in automatic exchanges.

An object of the invention is to provide a novel all relay type reverting call circuit which will provide more efficient operation.

A feature of the invention is the manner in which a reverting call switch is adapted to be seized over the all relay switch train and responsive to the receipt of impulses representing the suffix ring digits of the calling and called parties is operative to alternately apply the called and calling parties' signals to the line and to release when the called party answers the signal whereby the conversation is carried on over the local line circuit and the reverting call circuit and the switch train may be reused.

A further feature of the invention is the manner in which a reverting call circuit of the type described is arranged to release responsive to a signal from the calling party, called party, or after a predetermined period of time.

Another feature of the invention is the manner in which one group of relays in the reverting call circuit is arranged to operate responsive to a first series of digits, transfer the received digit to a second group of relays, and reoperate responsive to a second series of impulses to register the second digit; and in which both groups of relays select the proper ringing signals represented by the two digits and apply the selected ringing signals to the line.

A further feature of the invention is the manner in which the reverting call system is arranged to be used with exchanges connected for harmonic code ringing or for exchanges adapted for divided harmonic ringing by a simple strap adjustment.

Figure 1:
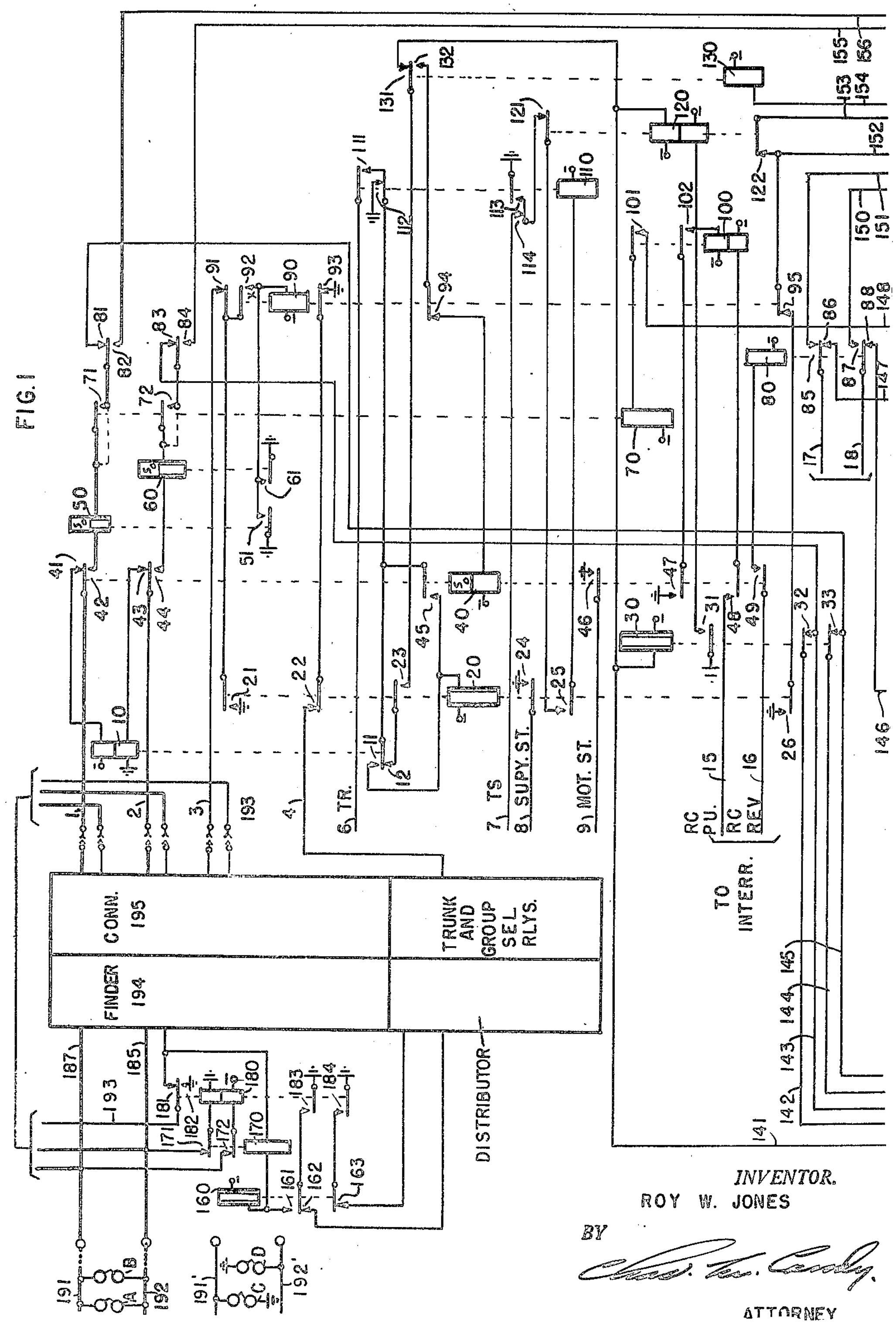
Figure 2:
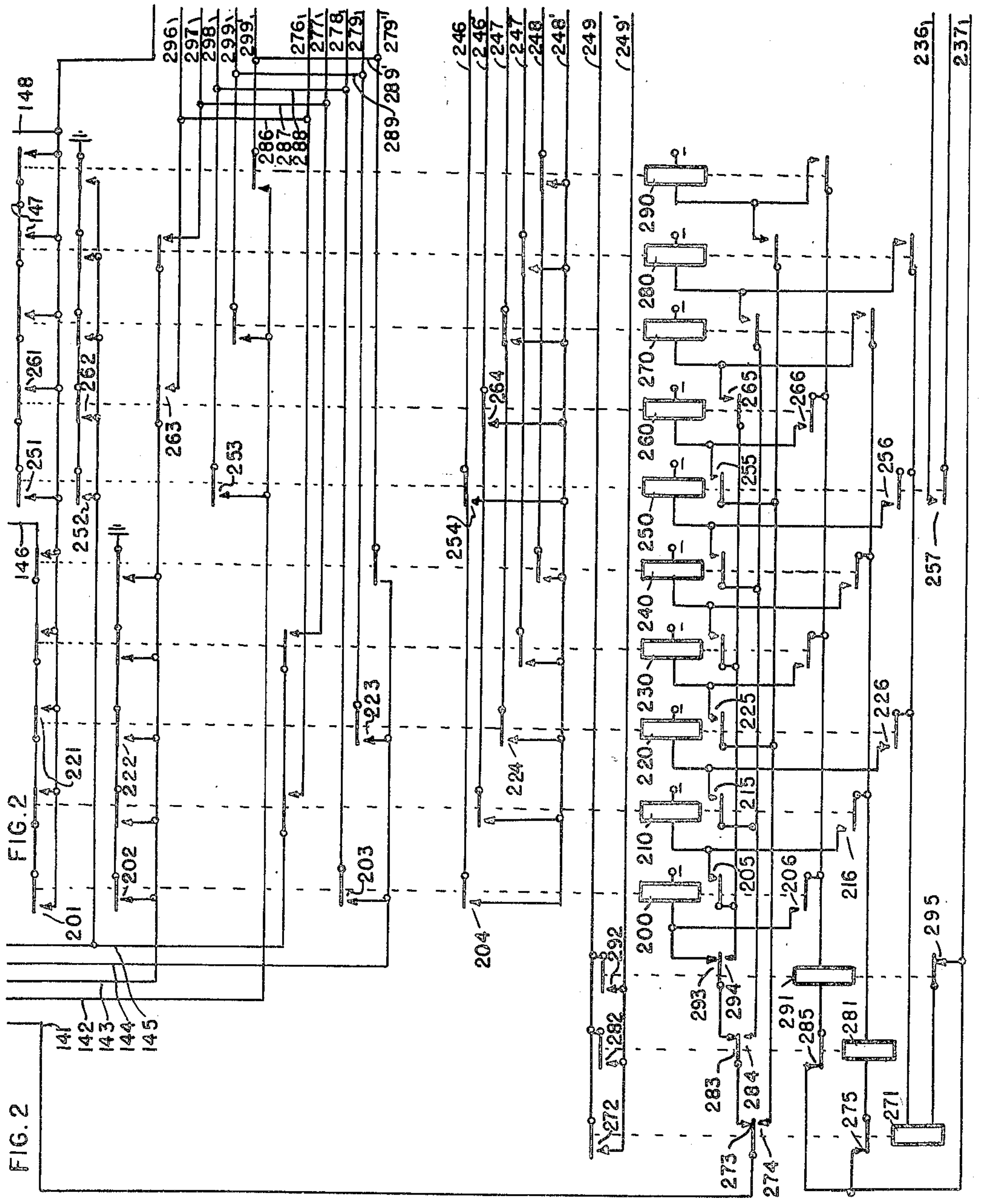
Figure 3:
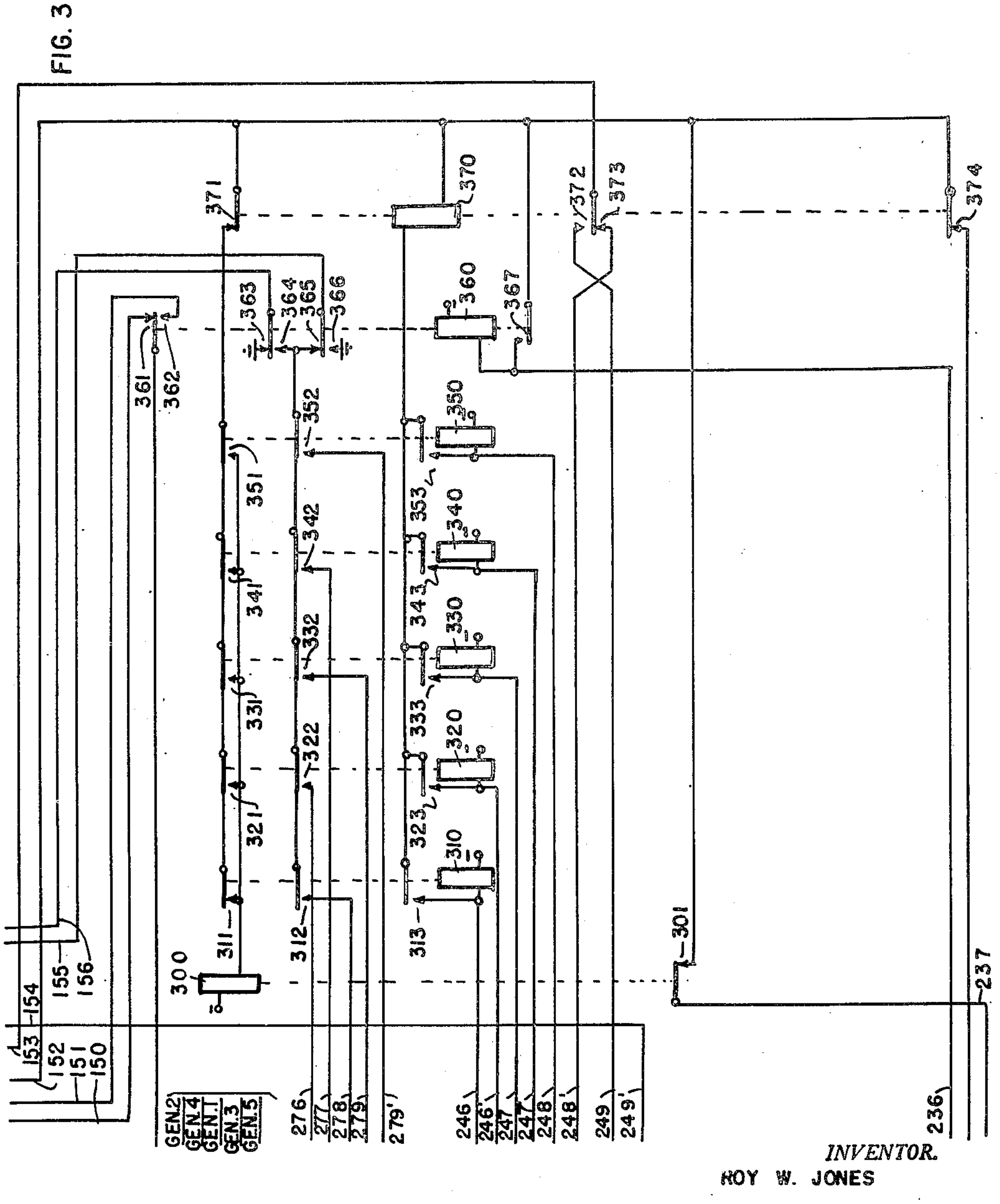

Referring now to the drawing comprising Figs. 1, 2 and 3, the automatic telephone system there illustrated incorporates the features of the applicant's invention as applied to a reverting call circuit.

Fig. 1 shows a plurality of substations connected to a party line. Stations A and B are connected for use with a code harmonic ringing system and stations C and D are connected for use with a divided harmonic ringing system. Fig. 1 also illustrates a line circuit, a finder, a connector with its associated trunk selecting relays, and a part of the reverting call circuit. Figs. 2 and 3 when properly arranged illustrate with Fig. 1 the circuit arrangement for the reverting call circuit.

The reverting call circuit is of the type which is seized over a finder-connector link on a switch-through basis by dialing a single digit assigned to the exchange for this purpose. When the reverting call circuit has been seized the subscriber first dials the last digit of his call number and then the last digit of the called party's number. On replacing his handset the reverting call circuit alternately applies the ringing signals for the called and calling parties to the line. When the called party enters, the switch train and the reverting call circuit are released and the conversation is carried on over the local line circuit.

The reverting call circuit as shown is arranged for use in exchanges using 10 party, 1 and 2 ring harmonic ringing, substations A and B being indicative of this type. Slight modification as indicated by the dotted lines at contacts 71 and 72 enable the arrangement for use in exchanges having 10 party divided harmonic ringing. Substations C and D are of this second type. The specification includes description for both arrangements.

Assuming, now, that a subscriber A desires to converse with a second subscriber B who has his substation on the same line as A. The first subscriber A dials a special digit which is assigned to the reverting call relay circuit. The relay switch train in the exchange (shown in block form) operates to extend the call to the illustrated circuit over conductors 1, 2 and 3 in a well known manner. The operation of extending the call to the reverting circuit and the subsequent operations by the subscriber are somewhat similar to those set forth in the Saunders Patent 1,805,726 issued May 19, 1931 on pages 18, 19, and 20 wherein the reverting call circuit effectively uses Strowger type switches.

More specifically, however, when the receiver is removed from the hookswitch at station A, a bridge is closed across the line conductors 191 and 192 in the usual manner and a circuit is thereby completed for the double wound relay 180 in the line circuit. Line relay 180 operates and at its contacts 182 connects ground to the C lead 193 to busy the line in the outgoing terminals of the connector switches. Marking ground for the finder distributor is connected by relay 180 at its contacts 183 and 184. The finder-connector link may be of the type shown in the Voss et al. Patent 2,491,291 issued December 13, 1949, and when the tens and units marking ground is sent forward through the distributor the finder 194 is operated to connect the calling line to the connector as set forth in the Voss et al. application.

The finder also sends ground back over conductor 186 to operate cut-off relay 170 and lockout relay 160 in series. Relay 170 at contacts 171 and 172 disconnects relay 180 from in bridge of the line and relay 180 releases. Relay 160 at contacts 162 and 163 disconnects marking ground from the distributor and prepares a locking circuit for itself at contacts 161. At contacts 181 relay 180 connects ground from the finder to busy the connector terminal. The connector switches are preferably of the all relay switch-through type shown in the previously mentioned application of Voss et al. The connector circuit is shown in Figs. 6, 7, 8, 9 and 10 of the Voss et al. application. The trunk selecting relays for use therewith are shown in Figs. 11, 12, 13, 14 and 15 of the Voss et al. application. The description in the Voss et al. application under the heading "Trunk calls" is appropriate to the manner of operation of the link in completing a call to a trunk group by means of a single digit. In this case, revertive call circuits, as described herein, are connected to the connector terminals of connector 195 in lieu of the various trunk groups disclosed in the Voss et al. application.

It is apparent that when the receiver is removed by subscriber A, the calling line is picked up by the finder switch 194 of a finder connector link and establishes a connection to the connector 195 which is thereafter under the control of the calling dial. When the subscriber dials the single digit assigned to the reverting call circuit, the connector switch 195 operates to extend the call to the reverting call circuit.

When the reverting call circuit is seized over conductors 1, 2 and 3 a loop is completed to line relay 10. The line relay 10 operates and at its contacts 11 completes a circuit to relay 20, at its contacts 12 opens a further point in the circuit for relay 30. Relay 20 operates and at its contacts 21 connects ground to lead 3 over contacts 91 to hold the preceding switch train, at its contacts 22 opens a point in the busy circuit to the trunk selecting relays (shown in block form) to prevent seizure by another party while the reverting call circuit is in use. Relay 20 at its contacts 23 prepares a point in the operating circuit to relay 30 and the register relays, at its contacts 24 completes a circuit to the supervisory start relay (not shown) over lead 8 to start an associated timing circuit, at its contacts 25 prepares a circuit for relay 110 which is controlled by the associated timing circuit over contacts 25, 121, 114 and lead 7. At its contacts 26, relay 20 prepares a holding circuit for the storage and register relays.

The calling subscriber now dials the ring digit suffix of the number assigned to his own substation and line relay 10 releases and operates responsive to the impulses. On the first release after seizure, relay 10 at its contacts 11 opens the operating circuit to relay 20. Relay 20 is slow to release and will hold during the break periods of each impulse. Relay 10 at its contacts 12 completes a circuit from the holding ground over contacts 112, 12, 23 and 131 to relay 30, and to the upper winding of relay 120. A circuit is also completed to the first register relay 200 over contacts 112, 12, 23, 131, 273, 283 and 293. Relay 30 operates, at its contacts 31 completes an operating circuit to the lower winding of relay 120, and at its contacts 32 and 33 opens further points in the line ringing circuit. Relay 120 operates and at its contacts 121 opens the circuit from the associated timing circuit to relay 110 and at its contacts 122 opens a point in the operating circuit to storage relays 310 to 350. Register relay 200 operates, at its contacts 201 prepares a point from the generator lead 16 which supplies one ring service to relay 70, and at its contacts 202 prepares a ringing circuit for negative side of the line by connecting ground to the positive side of the line. This arrangement is applicable in the event that divided ringing is used. Relay 200 at its contacts 203 prepares a circuit from generator 1 to ring over the negative side of the line, at its contacts 204 prepares a circuit to the first storage relay 310, at its contacts 205 prepares an operating circuit for the second register relay 210, and at its contacts 206 completes a self holding circuit and an operating circuit for control relay 291 over contacts 285, line 237, contacts 301, line 152, contacts 95 and 26. Relay 291 will not operate however because of the multiple ground circuit controlled by the line relay contacts 12 which is completed to the first register relay 200 at the time. However, when the make period of the succeeding impulse is received over the line, line relay 10 operates and at its contacts 12 opens the multiple ground circuit to relay 200 and relay 291 operates in series with relay 200. The operating circuit to relay 30 is also opened, but relay 30 is a slow to release relay and holds during the impulse series. At its contacts 292 relay 291 prepares a circuit to relay 130, at its contacts 293 opens a further point in the operating circuit to relay 200, at its contacts 294 prepares an operating circuit for the second register relay 210, and at its contacts 295 opens a further point in the circuit to relay 271. On receipt of the break period of the second impulse a circuit is completed for the second register relay 210 over contacts 112, 12, 23, 131, 273, 283, 294 and 205. The register relay 210 operates and at its contacts 215 prepares a circuit for relay 220 at its contacts 216 prepares a circuit for control relay 281. Relay 281 operates when the multiple ground circuit to relay 210 is opened by the line relay 10 at its contacts 12 on receipt of the succeeding make period. The control relay 281 operates and at its contacts 284 prepares a point in the operating circuit to the next register relay 220, and at its contacts 285 opens the holding circuit to the first register relay 200 and the control relay 291. Relays 200 and 291 release. Relays 210 and 281 remain operated over the holding circuit comprising contacts 216, 275, line 237, contacts 301, lead 152, contacts 95 and 26. It is obvious from this description that each succeeding impulse operates a further register relay and the control relay associated therewith which effects release of the previously operated register and control relays.

Assuming that the digit dialled by the subscriber was 7, register relays 200, 210, 220, 230, 240, 250 and 260 will operate with their associated control relay as just described. Additionally, when relay 250 operates, at its contacts 257 a circuit is completed for storage relay 360 over contacts 257, line 235, contacts 374, 95 and 26. Relay 360 operates and at its contacts 361 opens a point in the 1 ring lead from the interrupter to ringing interrupter relay 70, and at its contacts 362 closes a point in the 2 way interrupter circuit to relay 70. Relay 360 at its contacts 363 opens a point in the ground connection to the negative side of the line, at its contacts 366 prepares a ground connection to the positive side of the line, at its contacts 364 prepares a point in the ringing circuit to the negative side of the line, and at its contacts 365 opens a further point in the ringing circuit to the positive side of the line This transfer of ground connections from one side of the line to the other is effective in the event that divided line ringing is desired. It is apparent from the storage relay contact connections that digits 1–5 of the calling parties' numbers are rung over one side of the line and digits 6–0 are rung over the other side. If 1 ring and 2 ring service is desired for bridged ringing, it is apparent that relay 360 at its contacts 361 effects one ring signal for digits 1–5 and at its contacts 362 effects a 2 ring signal for digits 6–0. The use of storage relay 360 enables the circuit to use 6 relays to store any one of ten different digits. Relay 360 at its contacts 367 completes a self holding circuit over contacts 367, line 152, contacts 95 and 26. The operating circuit to relay 360 is opened at contacts 257 when relay 250 is released responsive to receipt of the seventh break period. The succeeding register relay 260 is operated as described heretofore and at its contacts 264 prepares a circuit to the second storage relay 320. Control relay 291 is also in the operated condition.

On termination of the incoming impulses, line relay 10 remains energized and at its contacts 12 holds open the operating circuit to relay 30. After a brief interval relay 30 releases and at its contacts 31 opens the operating circuit to the lower winding of relay 120. The holding circuit for the upper winding of relay 120 is also open at contacts 12 of the line relay. Relay 120 releases and at its contacts 121 completes a circuit from the timing equipment to relay 110, and at its contacts 122 completes an operating circuit to storage relay 320 over contacts 26, 95, 122, lead 153, contacts 373, lead 248', contacts 264 and lead 246'. Storage relay 320 operates, at its contacts 321 completes a circuit to relay 300, at its contacts 322 prepares a point in the circuit from generator 2 to the negative side of the line and at its contacts 323 prepares a self holding circuit through relay 370, lead 152 and contacts 95 and 26. Relay 370 is short circuited by the operating circuit which is completed to storage relay 320. Relay 300 operates and at its contacts 301 opens the holding circuits for register relay 260 and control relay 291. Relays 260 and 291 release. Relay 260 at its contacts 264 opens the original operating circuit to storage relay 320, which effects operation of relay 370 by removing the short circuit on same. Storage relay 320 holds over the holding circuit described. Relay 370 at its contacts 371 opens the operating circuit to relay 360, at its contacts 372 prepares a circuit for transfer relay 130, at its contacts 373 opens a further point in the operating circuit for the storage relays and at its contacts 374 opens the operating circuit to relay 360 which holds over a self holding circuit comprising contacts 367, lead 152, contacts 95 and 26. Relay 300 releases and at its contacts 301 prepares the register relays for receipt of the next series of impulses.

It is apparent that the calling subscriber has seized the reverting call circuit and dialled the ring digit suffix assigned to his own substation and thereby effected operation of the register relays in the reverting call circuit. The register relays have operated in sequence responsive to each impulse and upon completion of the receipt of the digit effected a transfer of the digit received to a set of storage relays. The storage relays select the frequency for signaling the calling party and selects the 1 ring or 2 ring interrupter lead for ringing purposes or in the event that divided ringing is being employed, they select the side of the line to be rung. Further, the register relay and control relay which were operated to accomplish the results described are released to thereby prepare the set for receipt of the called party's digit and to prepare the register relays for reuse in handling the called party's digit. Relays 10, 20, 320, 360 and 370 are now in the operated condition.

The calling subscriber now dials the station suffix digit of the called substation and line relay 10 operates in response thereto. On the first impulse relays 30, 120 and 200 are operated in the manner heretofore described. Assuming that the subscriber dialled the digit 3, the register relay 220 and control relay 271 will be in the operated condition on termination of the impulses representing the digit 3. Relay 220 at its contacts 221 prepares a circuit from the 1 ring interrupted lead to ring interrupter relay 70 and at its contacts 222 prepares a circuit for ringing over the negative side of the line by completing a point in the ground connection to the positive side of the line. At its contacts 223, relay 220 completes a point in the circuit from generator 3 to the negative side of the line for signaling the called party and at its contacts 224 prepares a circuit to the storage relays which is ineffective at this time in that relay 370 at its contacts 373 maintains the circuit open whenever a storage relay is in the operated condition. It is apparent from the register relay contact connections that if the called party's digit is from 1 to 5, the called party's frequency will be applied over the negative side of the line and if the digit is from 6–0 the called party's frequency will be applied over the positive side of the line. Further, if 1 ring and 2 ring service is being used, digits 1 to 5 inclusive are rung once. Although digits 6–0 utilize the same five frequencies used for the first five digits, the connections are such that a 2 ring interrupter lead is connected to the ringing interrupter relay. The generator frequency to be used is selected by the register relay remaining operated responsive to the digit received, in this case contacts 223 on register relay 220. At its contacts 225, relay 220 prepares a circuit for register relay 230 and at its contacts 226 prepares a circuit for control relay 271 which operates when the line relay 10 energizes following termination of the series of received impulses representing the called party's digit.

A short interval after receipt of this digit, relays 30 and 120 release, the holding circuits for same being opened at the line relay contacts 12. Relay 120 at its contacts 122 completes a circuit to relay 130 over contacts 26, 95, 122, lead 153, contacts 372, lead 249, contacts 272, and lead 249'. Relay 130 operates and at its contacts 132 prepares a circuit to relay 40, and at its contacts 131 opens a further point in the circuit to relays 30 and 120 to prevent their subsequent operation. Relays 10, 20, 130, 271, 220, 320, 360 and 370 are in the operated condition.

The calling party now replaces his handset and thereby effects deenergization of line relay 10 which at its contacts 11 opens the circuit to relay 20 and at its contacts 12 completes a circuit to relay 40 over contacts 112, 12, 23, 132 and 94. Relay 40 operates and at its contacts 41 and 43 disconnects the line relay 10 from the incoming line, at its contacts 42 and 44 completes a point in the circuit from the incoming line to the ringing circuits, and at its contacts 45 completes a holding circuit for relay 20 over contacts 112 and 45. Relay 20 is slow to release and remains operated until this holding circuit is completed thereto and thereby prevents release of the preceding operated switch train and line circuit cutoff relay 170. At its contacts 46, relay 40 completes a circuit to the motor start relay over lead 9 to start the interrupter, at its contacts 47 prepares a holding circuit for pickup relay 100, at its contacts 48 completes a circuit from the interrupter pickup lead 15 to pickup relay 100, and at its contacts 49 connects interrupter lead 16 to relay 80. Lead 16 is connected to ground in the ringing interrupter on alternate code cycles. Relay 80 therefore will energize for one code cycle and restore for the duration of the next code cycle. At the beginning of a ringing cycle ground is connected for a short interval of time over pickup lead 15 and contacts 48 to relay 100. Relay 100 operates and at its contacts 101 completes a circuit to ringing interrupter relay 70 and at its contacts 102 completes a self-holding circuit over contacts 47 and 102.

A ground pulse is supplied to relay 70 by the interrupter over the one ring lead 18, contacts 88, lead 146, contacts 221, and contacts 101. Relay 70 operates to connect the ringing circuit to the incoming line over contacts 42 and 44, 71 and 72, 81 and 83, 33, 222 and 223 and a ground and generator connection. It is seen therefore that the called party's signal, which in this case is represented by a single ring of the frequency of generator three, is transmitted over the negative side of the line. If the phones are bridged across the line, the two ringers responsive to the frequency of generator three will ring once, and the one party to whom the one ring signal was assigned will answer. The party who has been assigned digit 8 will answer when 2 rings of the frequency output of generator three are applied to the line. In the event that the dotted connections, which are shown as by-passing contacts 71 and 72, are utilized, ringing interrupter relay 70 will be ineffective. The ringers, if connected to the line for use in a divided ringing arrangement, will be operated when the proper frequency is applied to the proper side of the line. Thus, with five frequency generators, five substation sets each with a different frequency can be used on one side of the line and five sets responsive to those same five frequencies can be employed on the other side of the line.

When lead 16 is connected to ground by the interrupter on the subsequent code cycle, relay 80 will operate and at its contacts 82 and 84 connect a second ringing circuit to the line over contacts 42 and 44, 71 and 72, 82 and 84, lead 155 and 156, contacts 364 and 366 to ground, 322, lead 276, 286 and 296, and generator 2. Relay 80 at its contacts 85 connects the two ring interrupter ground to relay 70 over contacts 85, lead 151, contacts 362 and 101. Relay 70 operates twice, and on each operation connects the ringing frequency of generator two to the line to signal the calling party. The ringing frequencies are alternately applied to the line to thereby repeatedly signal the called party and the calling party.

When the call is answered, relay 50 or relay 60 will operate and at their contacts 51 or 61 complete a circuit to relay 90. Relay 90 operates and at its contacts 91 opens the holding ground circuit to the preceding finder connector link to release the same, at its contacts 92 completes a self holding circuit over contacts 21 and 92, at its contacts 93 opens a further point in the busy circuit over lead 4 to prevent seizure before the reverting call circuit is completely released, at its contacts 94 opens the operating circuit to relay 40, and at its contacts 95 opens the holding circuit to the operated storage relay 320 and 360, the operated register relay 220, the operated control relay 271, relay 130, and relay 370. Relays 320, 360, 220, 271, 130, 370 release. Relay 40 releases and at its contacts 41 and 43 reconnects the line relay 10 to the incoming line conductors, at its contacts 42 and 44 disconnects the ringing circuits to the line and also opens the operating circuit to relays 50 and 60, at its contacts 45 opens the holding circuit to relay 20, at its contacts 46 opens the circuit to the relay which operates the interrupter, at its contacts 48 and 47 opens the operating and holding circuits for relay 100, and at contacts 49 opens the circuit to relay 80. Relays 50, 60, 80 and 100 release. Relay 70 releases on removal of the interrupter ground or when the operated storage or register relay releases. Relay 20 releases and at its contacts 21 opens the holding circuit to relay 90. Relay 90 releases and the reverting call set is available for further use by other party lines.

When the ground is removed from the lead 3, the finder-connector link releases and removes ground from conductor 185 to open the circuit to cut-off relay 170 and lockout relay 160 and cut-off relay 170 releases. Line relay 180 then energizes over contacts 171 and 172 and the line bridge which is completed by the hookswitch at the answering party's substation and at its contacts 182 connects ground to the C lead 193 to mark the line busy to the connectors. Line relay 180 at contacts 183 completes a holding circuit by way of contacts 161 before the slow to release lockout relay 160 has had sufficient time to release with the result that relay 160 is now maintained energized by line relay 180 to open the marking leads to the distributor.

Talking battery is fed to the line through the windings of the line relay 180 and the line circuit is therefore the only equipment in use during the conversation between the parties.

Release of the line circuit is effected when the last party hangs up. Relay 180 releases and at its contacts 183 opens the holding circuit to relay 160. Relay 160 restores and the line circuit is in its normal condition.

In the event that a call was initiated but not completed through the reverting call circuit, it will be released after a predetermined time interval after seizure by operation of an associated timing circuit. The timing circuit is started on seizure of the reverting call circuit at contacts 24 on relay 20. The timing equipment transmits a grounded pulse over lead 7 after a predetermined time interval to operate relay 110. Relay 110 operates and at its contacts 111 and 112 transfers the holding ground for the reverting call set to the timer equipment over lead 6, and at its contacts 113 and 114 opens its operating circuit from the timer and completes a self holding circuit over contacts 113, 121 and 25. When the predetermined time has elapsed, the holding ground is removed from lead 6 to open the circuit to relay 20 which releases and restores the reverting call circuit and the finder-connector link to normal by removing ground from conductor 3 which has been holding the link in an operated condition. The release of the finder-connector link restores line relay 10 and also removes ground from conductor 186 to restore cut-off relay 170 and cause the operation of line relay 180 while lockout relay 160 is retained in the operated position. The line circuit therefore remains in the lock-out condition until the party initiating the call replaces the receiver. In the event the called party does not answer after being signalled the calling party may lift his receiver which will effect operation of relays 50 or 60 as heretofore described and the reverting call circuit will be restored to normal or if both the called and calling parties fail to answer, the timer circuit will effect release of the circuit after a predetermined time.

Timing out in case both the called and calling parties fail to remove their receivers is accomplished automatically. It will be remembered that relays 20, 40, 100, 110, 130, 271, 220, 320, 360 and 370 are in the operated condition. The holding ground for the circuit is connected over contacts 112. After a predetermined time, ground is applied to conductor 7 to operate relay 110. Relay 110 locks to ground over contacts 113, 121 and 25 and at its contacts 111 transfers the holding ground to the timer circuit over lead 6. After a further predetermined time, ground is removed from lead 6 and the reverting call circuit will restore to normal as previously described.

While a particular embodiment of the invention has been described, it will be understood that various modifications may be made therein which are within the true spirit and scope of the invention.

What is claimed is:

1. In a reverting call circuit for use with a party line system using harmonic ringing and having substations connected in bridge of said line, an incoming line, a line relay operated responsive to impulses received over said incoming line, a group of register relays operated in succession responsive to the successive operations of said line relay, means for maintaining one of said register relays in the operated condition on termination of a first impulse series in accordance with the number of impulses received, a group of storage relays, said register relays divided into pairs of relays for controlling said storage relays, means controlled by each pair of said register relays to complete a point in the operating circuits for each of said storage relays, said point in said operating circuit to a storage relay completed whenever either one of said pair of register relays is in the operated position, a transfer relay automatically operated on termination of said first impulse series to complete a circuit to one of said storage relays over the operating circuit prepared by the register relay in the operated condition, means controlled by said storage relay to release the operated register relay and to complete a self holding circuit, said register relays reoperated in succession responsive to the operation of said line relay by a second series of impulses thereto, means for maintaining one of said register relays in the operated condition on termination of said second impulse series in accordance with the number of impulses received, a plurality of ringing frequency circuits, a plurality of code ring circuits, means controlled by said operated register relay to select the ringing frequency and code ring circuits to signal the called party, means controlled by said operated storage relay to select the frequency and code ring circuits to signal the calling party, and means controlled by reoperation of said transfer means responsive to the termination of said second series of impulses to prepare to alternately connect each of the selected ringing signals to the line.

2. In a reverting call circuit for use in a party line system using divided harmonic ringing, an incoming line, a line relay operated responsive to impulses received over said incoming line, a group of register relays operated responsive to operation of said line relay by a first series of impulses, a group of storage relays, means controlled by each of said register relays to prepare the operating circuit of a storage relay, means for completing a circuit to one of said storage relays over the operating circuit prepared by the register relays after the termination of said first series of impulses, means controlled by the storage relays to then release the operated register relays, means for maintaining said storage relay operated on release of said register relays and the completed operating circuit, said group of register relays reoperated responsive to the operation of said line relay by a second series of impulses, means for maintaining one of the register relays in the operated condition, a plurality of frequency sources, means controlled by the operated register relay to select a frequency and side of the line for signaling the called party, means controlled by said operated storage relay for selecting the frequency of the calling party, a control storage relay having an operating circuit controlled by only one of said register relays, means controlled by said control storage relay for selecting the side of the line for signaling the calling party, and means for alternately applying the selected frequencies for the called and calling parties to the line.

3. In a reverting call circuit for use in a party line system for enabling one party to call another on the same line, an incoming line, a line relay operated responsive to series of impulses received over said line, a group of register relays operated responsive to operation of the line relay by a first series of impulses indicative of the calling party's number, one of said register relays maintained operated on termination of the first series of impulses in accordance with the number of impulses received, a group of storage relays, circuit means controlled by said operated register relay for controlling operation of an associated storage relay, means for operating said storage relay over said circuit means and maintaining it in said operated condition after release of the operating circuit to thereby effectively store the set of impulses indicative of the calling party's number, means operated by said storage relay to release said operated register relay, said register relays reoperated responsive to operation of the line relay by a second series of impulses indicative of the called party's number, one of said register relays maintained operated on termination of the second series of impulses in accordance with the number of impulses received, a plurality of sources of frequencies, a plurality of code ring circuits, means controlled by the operated register relay for selecting the frequency, the code ring circuit and the proper side of the line for ringing the called party, means controlled by the operated storage relay for selecting the frequency, the code ring circuit, and the proper side of the line for ringing the calling party, means for connecting the code ring and the frequency selected to comprise the signals for the parties to the line, and cross connecting means for making the code ring ineffective whereupon the parties are signalled by means of the frequency and side of the line selected, and means for alternately connecting the calling and called parties' signals to the line as selected in accordance with the existing connections.

ROY W. JONES.

REFERENCES CITED

The following references are of record in the file of this patent:

UNITED STATES PATENTS

| Number | Name | Date |
|---|---|---|
| 1,450,321 | Lundell | Apr. 3, 1923 |
| 1,849,087 | Hovland | Mar. 15, 1932 |
| 2,187,186 | Wallace | Jan. 16, 1940 |
| 2,325,877 | Powell | Aug. 3, 1943 |
| 2,443,945 | Bellamy | June 22, 1948 |

OTHER REFERENCES

Smith and Campbell, Automatic Telephony, McGraw-Hill, 1921, page 313.